W. SCOTT.
ELASTIC DEVICE FOR INSERTION IN DRIVING MECHANISM.
APPLICATION FILED SEPT. 2, 1921.

1,413,940. Patented Apr. 25, 1922.

Witnesses.
H. W. Duvall.
Albert Polena

Inventor
Walter Scott,
By Sturtevant & Mason
Attorneys

UNITED STATES PATENT OFFICE.

WALTER SCOTT, OF MIDDLESBROUGH, ENGLAND.

ELASTIC DEVICE FOR INSERTION IN DRIVING MECHANISM.

1,413,940.

Specification of Letters Patent. Patented Apr. 25, 1922.

Application filed September 2, 1921. Serial No. 497,980.

*To all whom it may concern:*

Be it known that I, WALTER SCOTT, subject of the King of Great Britain, residing at Middlesbrough, in the county of York and Kingdom of England, have invented certain new and useful Improvements in Elastic Devices for Insertion in Driving Mechanism, (for which I have filed application in England No. 24,236, August 20, 1920,) of which the following is a specification.

The present invention relates to elastic devices or shock absorbers for inserting in the drive of driving mechanisms with a view to absorbing excess of power over a normal constant value and giving up again such power to the driven shaft at a later moment.

According to the present invention on the driving and driven shafts, helical surfaces are arranged with which a common element engages which element can only be displaced along such helical surfaces in either one direction or the other against springs. This displacement will take place whenever any sudden increase or decrease in the load transmitted occurs, but directly this increase or decrease has ceased, the floating member will return to its original position in which the force of the two springs engaging it on either side, is equal.

The invention is more particularly described with reference to the accompanying drawings in which:—

Figure 1:
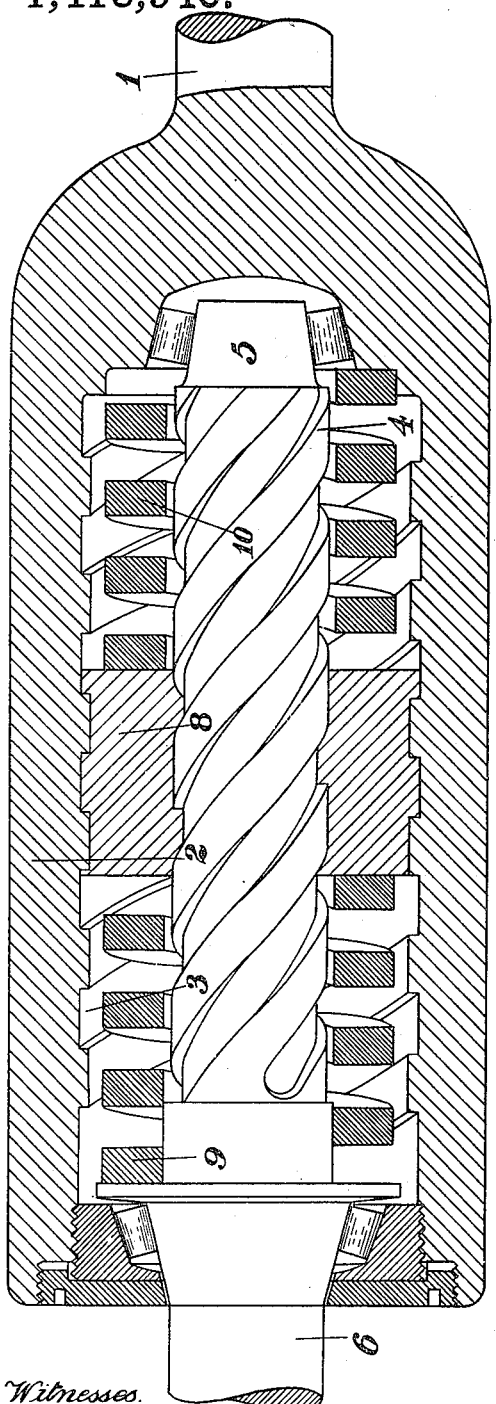
Figure 1 is a cross sectional elevation through one form of construction.

In the arrangement shown the driving shaft such as 1, has a hollow sleeve projection 2, provided with internal threading or helical grooving 3, which is of the same pitch as the threading or helical grooving 4, on the extension 5, of the driven shaft 6. It is however to be understood that if desired the shaft 6, may be the driving shaft whilst the shaft 1, may be the driven shaft.

A floating element or nut 8, having internal and external helical surfaces engages simultaneously with the internal threading on the sleeve 2, and the external threading on the shaft 5. On either side of the floating member 8, is arranged a compression spring 9, 10, thereby maintaining the nut 8, normally in position in which the loading of the springs 9, 10, will be equal.

It will consequently be seen that where a steady power is being transmitted from the shaft 1, to the shaft 5, the nut 8, will take up a position in which the loading of the springs 9, 10, will be constant and the nut 8, will not move. Directly however, that the torque between the shafts 1 and 6, varies, either positively or negatively from the normal value, the nut 8, will be displaced either against the spring 9, or the spring 10, and the surplus energy in the driving or driven shafts will be absorbed by these springs to be given up again at a later time.

Figure 2:
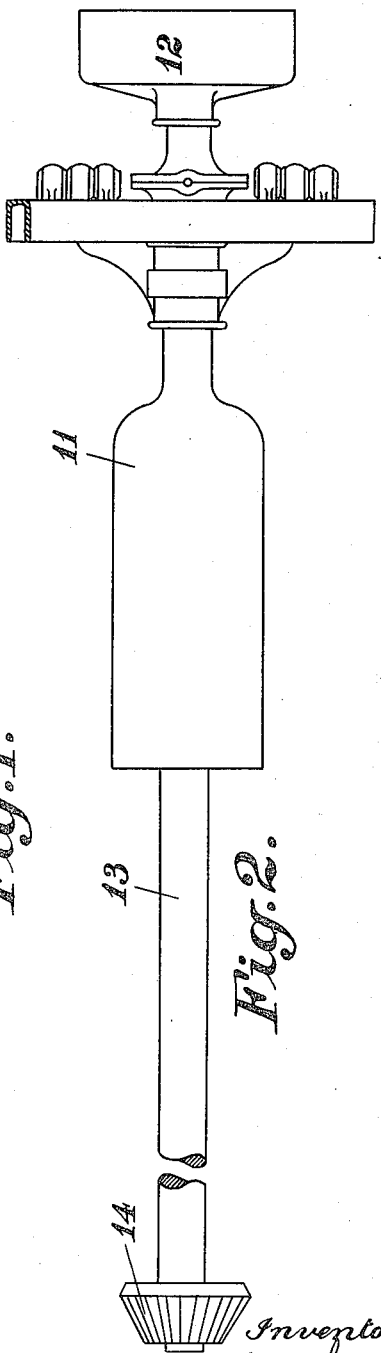
Figure 2 shows the device as applied to transmission of an automobile vehicle, taken by way of example.

In the arrangement shown in Fig. 2, such shock absorbing device is shown at 11, inserted in the drive between the engine 12, and a transmission shaft 13. By this means the power impulse of the engine will be evened out before reaching the driving element such as a bevel wheel 14.

The invention is shown applied by way of example to a drive between two coaxial shafts. It is obvious however that the drive can also be applied to other arrangements, for instance, concentric shafts such as between the hub and driving axle of a motor cycle taken by way of example.

The pitch of the thread on the interior shaft and that of the thread on the external sleeve are preferably equal but not necessarily so.

Instead of two springs as shown in the drawings, it is obvious that one spring can be used in each case. Again, means may be provided for adjusting the strength of the spring either when the device is stationary or again by some floating mechanism when the device is running under load.

It will be preferable to make the spring either with its turns nearer together at one end than at the other or of smaller section at one end than at the other, or again of tapered section, that is to say, in the form of volute helical spring so that light shocks will be absorbed as well as heavy ones.

In a further modification the outer sleeve can be threaded in the same direction as the driving shaft whilst the two sliding members work one within the other and interengage by means of a coarse thread running in an opposite direction to the threads on the driving and driven elements Shock would therefore cause the coupling member to twist and the nuts threaded between the driving and driven shafts to move in opposite directions to one another.

In a further modification of the invention the movement of one shaft through a greater angle than a predetermined one may operate the total disconnection of driving shaft from driven shaft. This arrangement will be particularly suitable for the driving of mechanism such as lathes, textile machines or other individual mechanism units from a main power shaft where damage may occur to the machine if the drive was completely rigid:

I declare that what I claim is:—

1. A torque equalizing device comprising in combination a driving shaft, a driven shaft, a threaded extension on said driving shaft, a threaded extension on said driven shaft enshrouding the extension on the driving shaft, a floating element threaded internally and externally and engaging both driving and driven shaft extensions and a spring between said floating element and said driving and driven shafts respectively.

2. A torque equalizing device comprising in combination a driving shaft, a driven shaft, a threaded extension of said driving shaft, a threaded extension on said driven shaft enshrouding the extension on the driving shaft, the threading being of equal pitch to the threading on the driving shaft, a floating element threaded internally and externally and engaging both driving and driven shaft extensions and a spring between said floating element and said driving and driven shafts respectively.

3. A torque equalizing device comprising coaxial threaded elements separate from one another to be connected to the driving and driven shafts respectively, flanges on said threaded elements, a floating sleeve engaging with the threading on each element and a spring between said floating element and said flanges.

4. A torque equalizing device comprising a driving shaft having a helically threaded end, a flange on said driving shaft, a driven shaft, an internally threaded sleeve on said driving shaft enclosing the threaded end of the driving shaft, a nut threaded internally and externally and engaging both the threaded end of the driving shaft and said sleeve, a spring between said nut and the flange on the driving shaft and a second spring between said nut and the inner end of said sleeve.

In witness whereof I have hereunto signed my name this 15th day of August, 1921, in the presence of two subscribing witnesses.

WALTER SCOTT.

Witnesses:
ARTHUR O. KNOTT,
HENRY MACKERETH.